United States Patent
Mack et al.

(10) Patent No.: US 10,333,162 B2
(45) Date of Patent: Jun. 25, 2019

(54) METHODS AND SYSTEMS FOR DETECTING LEAKS IN A FUEL CELL STACK

(71) Applicant: BLOOM ENERGY CORPORATION, Sunnyvale, CA (US)

(72) Inventors: Jerome A. Mack, San Carlos, CA (US); Jonathan Cerrona, Fremont, CA (US); John Fisher, San Jose, CA (US); James Wilson, San Francisco, CA (US); Tad Armstrong, Sunnyvale, CA (US); Harald Herchen, Los Altos, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 283 days.

(21) Appl. No.: 15/291,299

(22) Filed: Oct. 12, 2016

(65) Prior Publication Data

US 2017/0110746 A1    Apr. 20, 2017

Related U.S. Application Data

(60) Provisional application No. 62/241,261, filed on Oct. 14, 2015.

(51) Int. Cl.
  *H01M 8/0444*    (2016.01)
  *G01R 31/00*    (2006.01)
  *H01M 8/04664*    (2016.01)

(52) U.S. Cl.
  CPC ... *H01M 8/04679* (2013.01); *H01M 8/04447* (2013.01); *H01M 8/04462* (2013.01); *H01M 8/04477* (2013.01)

(58) Field of Classification Search
  USPC .................................................. 324/430–434
  See application file for complete search history.

(56) References Cited

U.S. PATENT DOCUMENTS

| | | | |
|---|---|---|---|
| 8,563,180 B2 | 10/2013 | Perry et al. | |
| 8,802,331 B2 | 8/2014 | Herchen et al. | |
| 9,164,064 B2 | 10/2015 | Couse et al. | |
| 9,176,085 B2 | 11/2015 | Gottmann et al. | |
| 2004/0018404 A1* | 1/2004 | Kojima | H01M 8/04223 429/431 |
| 2007/0196704 A1 | 8/2007 | Valensa et al. | |
| 2008/0199738 A1 | 8/2008 | Perry et al. | |
| 2013/0252119 A1* | 9/2013 | Gottmann | H01M 8/04022 429/415 |
| 2016/0011071 A1 | 1/2016 | Wilson et al. | |

* cited by examiner

*Primary Examiner* — Vincent Q Nguyen
(74) *Attorney, Agent, or Firm* — The Marbury Law Group PLLC

(57) ABSTRACT

Systems and methods for testing a fuel cell stack include a vacuum source, a test head including at least one isolated vacuum plenum configured to be positioned in fluid communication with a first portion of the fuel cell stack, the isolated vacuum plenum in fluid communication with the vacuum source, and a detector in fluid communication with the at least one isolated vacuum plenum for detecting the presence of a particular constituent of a fluid provided in a second portion of the fuel cell stack, where the second portion of the fuel cell stack is separated from the first portion of the fuel cell stack by at least one of an electrolyte and a fuel cell seal.

13 Claims, 10 Drawing Sheets

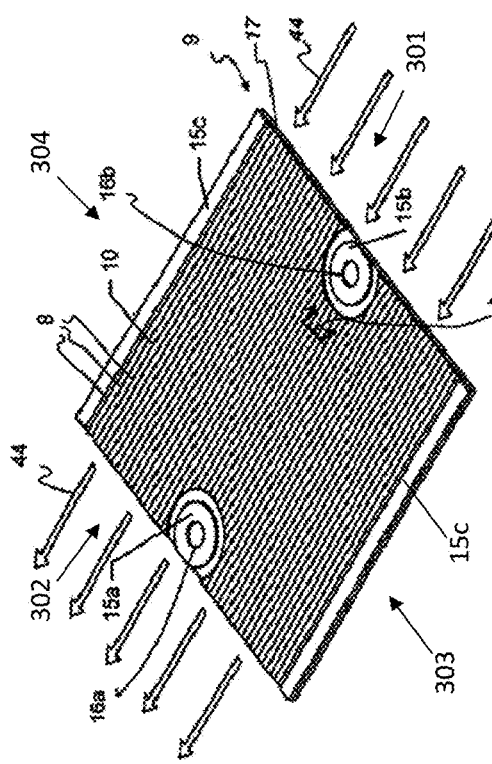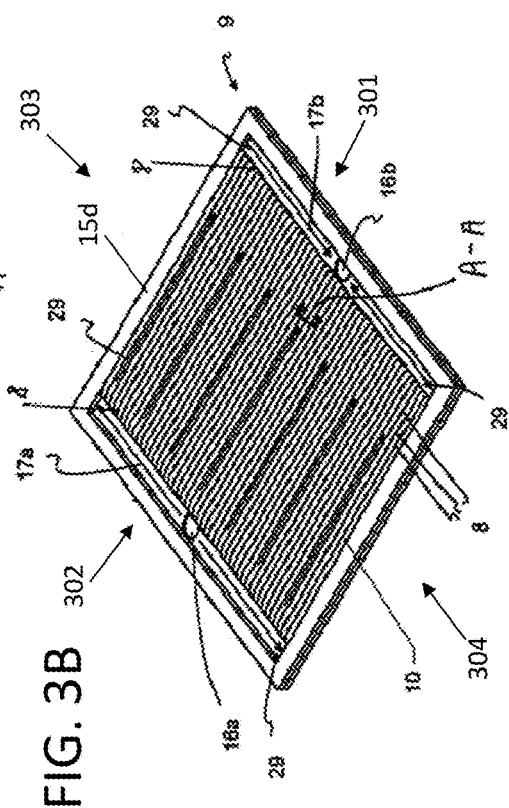
FIG. 3A
FIG. 3B

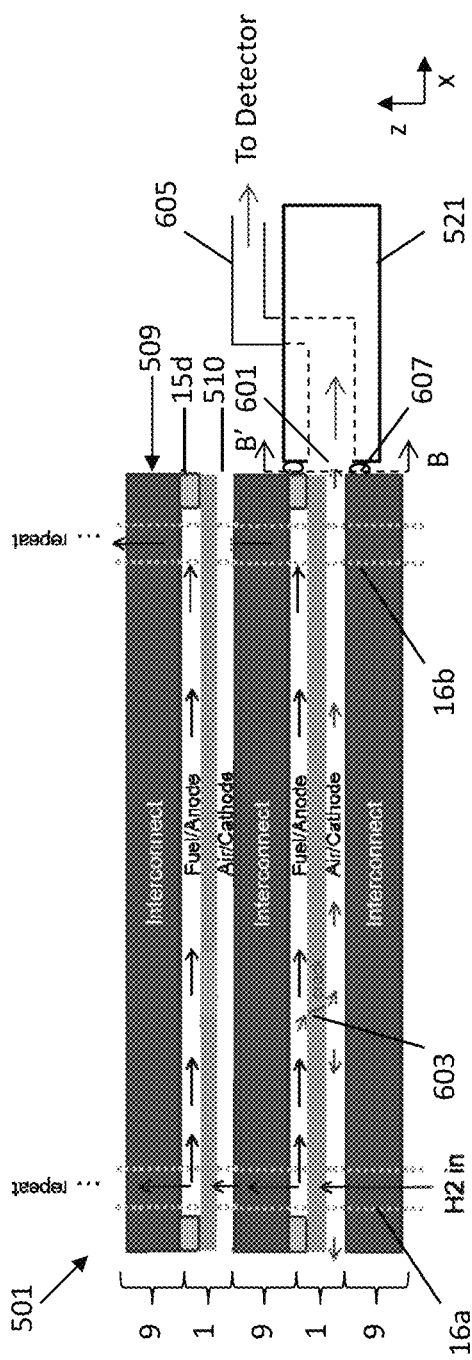
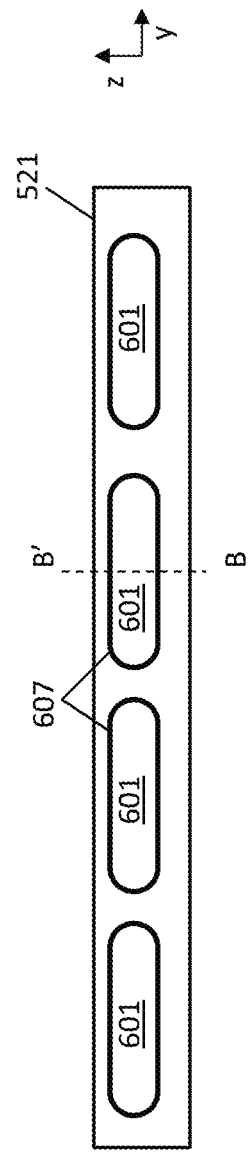
FIG. 6A
FIG. 6B

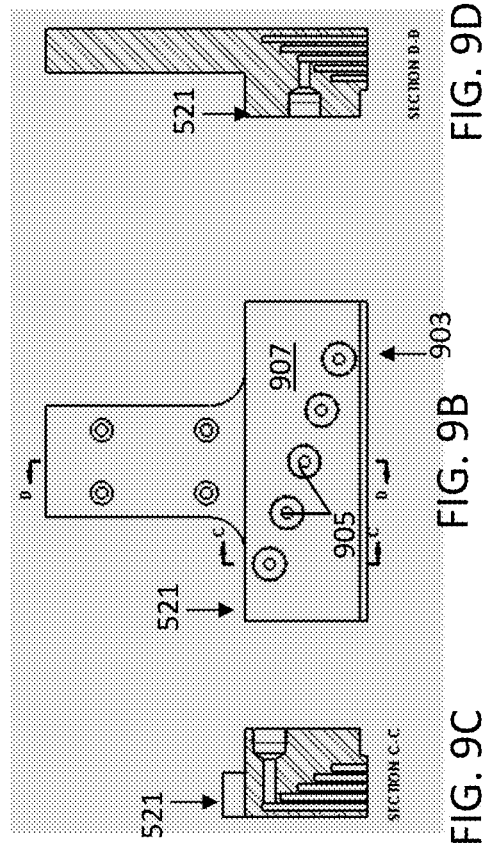
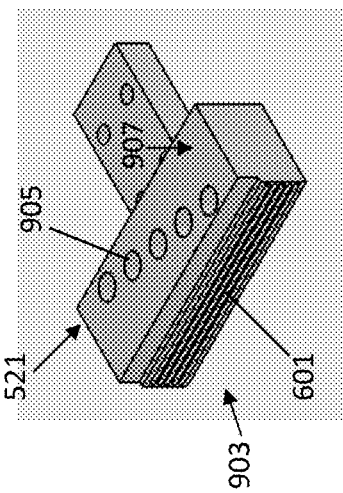
FIG. 9D
FIG. 9B
FIG. 9C
FIG. 9A

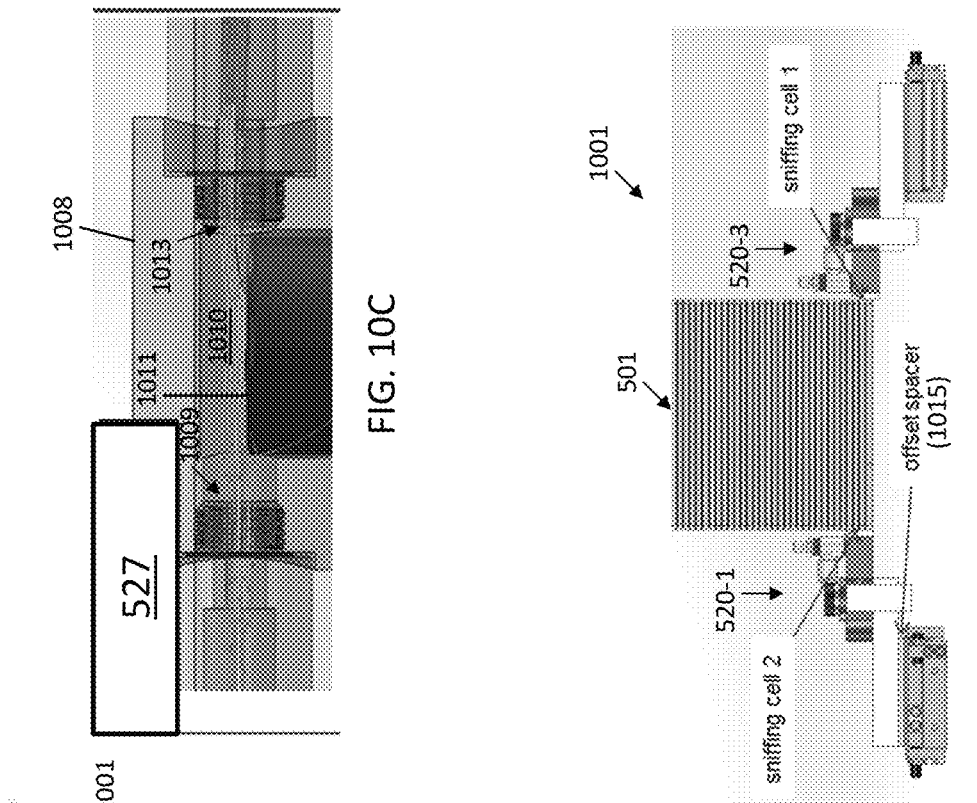
FIG. 10C
FIG. 10D
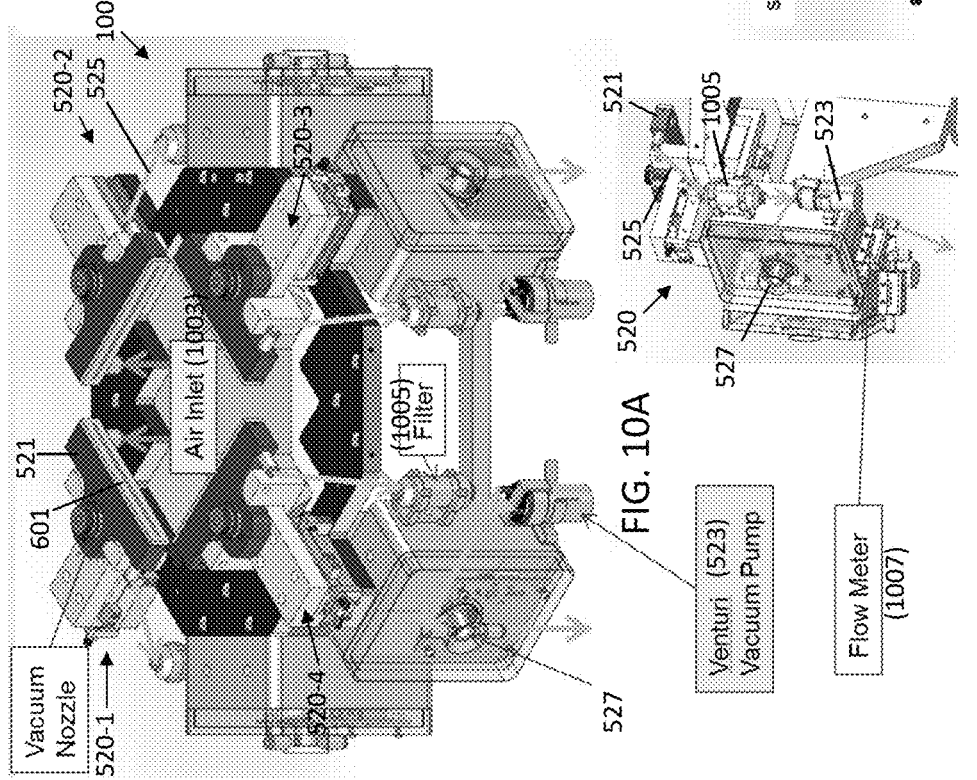
FIG. 10A
FIG. 10B

METHODS AND SYSTEMS FOR DETECTING LEAKS IN A FUEL CELL STACK

BACKGROUND

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit. A plurality of fuel cells may be assembled in a fuel cell stack, with electrically conductive interconnects located between each fuel cell of the stack.

SUMMARY

Various embodiments include systems for testing a fuel cell stack that include a vacuum source, a test head including at least one isolated vacuum plenum configured to be positioned in fluid communication with a first portion of the fuel cell stack, the isolated vacuum plenum in fluid communication with the vacuum source, and a detector in fluid communication with the at least one isolated vacuum plenum for detecting the presence of a particular constituent of a fluid provided in a second portion of the fuel cell stack, where the second portion of the fuel cell stack is separated from the first portion of the fuel cell stack by at least one of an electrolyte and a fuel cell seal.

Further embodiments include methods for testing a fuel cell stack that include positioning at least one isolated vacuum plenum in fluid communication with a first portion of the fuel cell stack, providing a fluid including a particular constituent to be detected in a second portion of the fuel cell stack that is separated from the first portion of the fuel cell stack by at least one of an electrolyte and a seal, providing fluid samples obtained by the at least one isolated vacuum plenum to a detector, and detecting for the presence of the particular constituent in the fluid samples using the detector.

Further embodiments include methods of testing a fuel cell stack including a plurality of fuel cells, the fuel cell stack being externally manifolded for a first reactant and having openings of the first reactant flow path on one or more open side surfaces of the stack, where the method includes interrogating individual fuel cells of the fuel cell stack using a test head including at least one plenum positioned within or adjacent to an opening of the first reactant flow path and a detector for detecting a particular constituent of a fluid provided in a reactant flow path of the fuel cell stack and determining the presence or absence of a leak in each fuel cell of the fuel cell stack based on detecting the presence of the particular constituent using the detector.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIG. 3A is a perspective view of a cathode side of an interconnect.

FIG. 3B is a perspective view of an anode side of an interconnect.

FIG. 6A is a partial cross-section side view of a fuel cell stack and a test head including an isolated vacuum plenum positioned adjacent to a side surface of the stack.

FIG. 6B is a front view of the test head viewed along line B-B' in FIG. 6A.

FIGS. 9A-9D illustrate an alternative embodiment of a test head for detecting leaks in a fuel cell stack.

FIGS. 10A-10D illustrate an alternative embodiment of a system for detecting leaks in a fuel cell stack.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In one aspect, the present invention provides accurate, rapid and non-destructive techniques for detecting defects in a fuel cell stack. Various embodiments include methods of testing an assembled fuel cell stack which may enable particular stack defects, such as leaks due to cracks in an electrolyte and/or defective seals, to be identified and located. Thus, the use of defective fuel cell stacks in a fuel cell system may be avoided. In some embodiments, defective components of the fuel cell stack identified with the embodiment method may be removed and replaced prior to utilizing the stack in a fuel cell system. In various embodiments, the testing method may be performed at a temperature that is significantly lower than the operating temperature of the fuel cell stack, and may be performed at a temperature between 0° C. and 50° C., such as between 20° C. and 30° C. (e.g., at room temperature).

Figure 1:
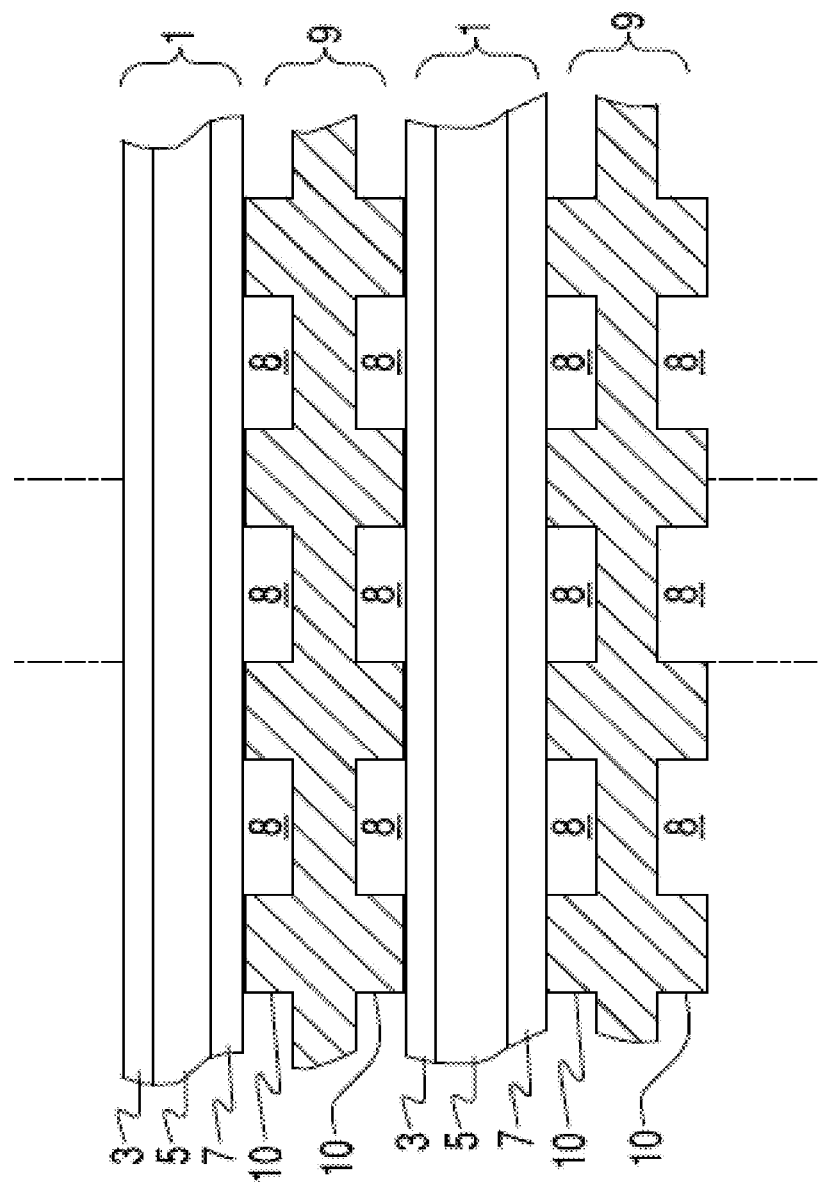
FIG. 1 illustrates a side cross-sectional view of a SOFC stack.

An example of a solid oxide fuel cell (SOFC) stack is illustrated in FIG. 1. Each SOFC 1 comprises a cathode electrode 7, a solid oxide electrolyte 5, and an anode electrode 3. The solid oxide fuel cell illustrated in this figure is an electrolyte supported cell in which the ceramic electrolyte 5 material can be a stabilized zirconia, such as scandia stabilized zirconia (SSZ) or yttria stabilized zirconia (YSZ). Alternatively, the electrolyte may comprise another ionically conductive material, such as a doped ceria. The cathode electrode 7 may comprise a thin layer of electrically conductive perovskite material, such as lanthanum strontium manganate (LSM), while the anode electrode 3 may comprise a thin layer of cermet material containing metal and ceramic phases, such as a nickel metal phase and a stabilized zirconia (e.g., SSZ or YSZ) or doped ceria ceramic phase (e.g., samaria doped ceria, SDC).

Fuel cell stacks are frequently built from a multiplicity of SOFC's 1 in the form of planar elements, tubes, or other geometries. Fuel and air has to be provided to the electrochemically active surface, which can be large.

The gas flow separator 9 (referred to as a gas flow separator plate when part of a planar stack), containing gas flow passages or channels 8 between ribs 10, separates the individual cells in the stack. The ribs 10 on opposite sides of the plate may be offset from each other, as described in U.S. Published Patent Application Number 2008/0199738 A1 (filed on Feb. 16, 2007 as U.S. application Ser. No. 11/707,070) which is incorporated herein by reference in its entirety. Frequently, the gas flow separator plate 9 is also used as an interconnect which electrically connects the anode or fuel electrode 3 of one cell to the cathode or air electrode 7 of the adjacent cell. In this case, the gas flow separator plate which functions as an interconnect is made of or contains electrically conductive material. The interconnect/gas flow separator 9 separates fuel, such as a hydrocarbon fuel, flowing to the fuel electrode (i.e. anode 3) of one cell in the stack from oxidant, such as air, flowing to the air electrode (i.e. cathode 7) of an adjacent cell in the stack. FIG. 1 shows that the lower SOFC 1 is located between two interconnects 9.

Figure 2:
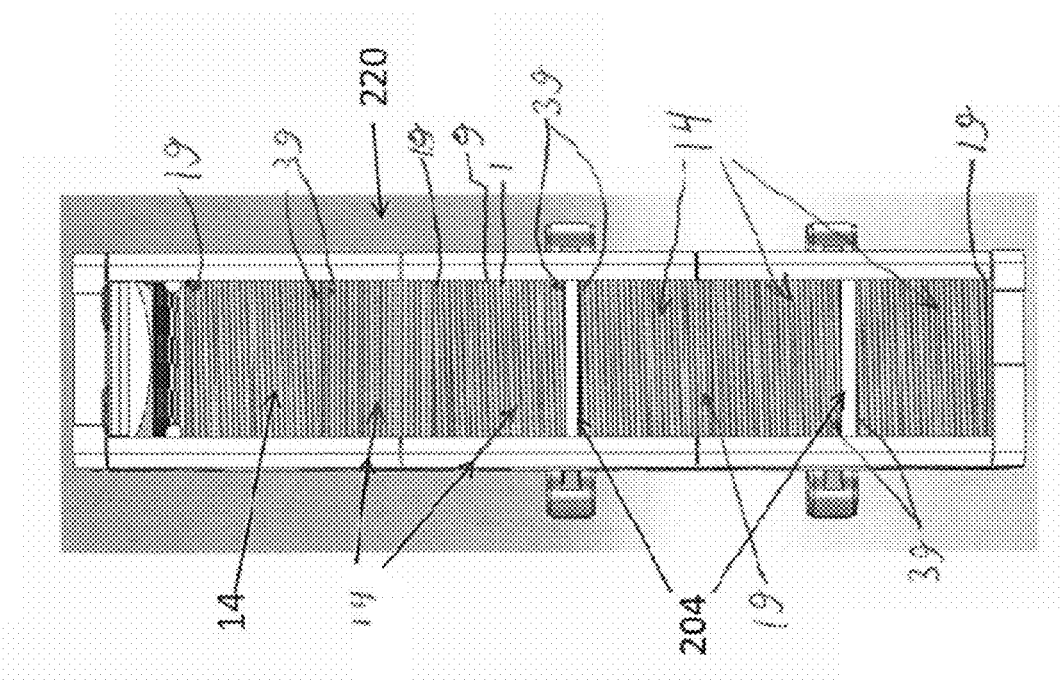
FIG. 2 illustrates a side view of an embodiment of a column of fuel cell stacks with plate shaped side baffles.

FIG. 2 illustrates a column containing one or more fuel cell stacks 14. Each fuel cell stack contains a plurality of the SOFCs 1 and interconnects 9, one air end plate 19 and one fuel end plate 39. As shown in FIG. 2, at either end of the stack 14, there may be an air end plate 19 or fuel end plate 39 for providing air or fuel, respectively, to the end electrode. The air end plate 19 faces the final cathode electrode 7 of the stack at one end of the stack (e.g., top or bottom end of the stack), while the fuel end plate 39 faces the final anode electrode 3 of the stack at the opposite end of the stack (e.g., bottom or top end of the stack).

Optionally, two side baffles 220 are placed on opposite sides of the stack. However, more or less side baffles 220 may be used for stacks having a cross sectional shape other than rectangular. Further, one or more fuel manifolds 204 may be provided in the column of fuel cell stacks 14. An exemplary fuel manifold is described in the U.S. application Ser. No. 11/656,563 incorporated by reference herein in its entirety. Any number of fuel manifolds 204 may be provided between adjacent fuel cell stacks 14 as desired. Further, the number of fuel cell stacks 14 in a column of fuel cell stacks 14 may be selected as desired and is not limited to the number of fuel cell stacks 14 illustrated in FIG. 2.

FIGS. 3A and 3B show, respectively, top and bottom views of an interconnect 9. The portions of interconnect 9 shown in side cross-section in FIG. 1 are provided along lines A-A in FIGS. 3A and 3B. The interconnect 9 contains gas flow passages or channels 8 between ribs 10. The interconnect 9 in this embodiment includes at least one riser channel 16a for providing fuel to the anode-side of the SOFC 1, as illustrated by arrow 29. The riser channel 16a generally comprises a fuel inlet riser opening or hole that extends through at least one layer of the fuel cells and interconnects in the stack. As illustrated in FIG. 3B, the fuel can flow through the inlet riser channel 16a to the anode-side of each fuel cell. There, the fuel can collect in an inlet plenum 17a (e.g., a groove in the interconnect's surface), then flow over the fuel cell anode 3 through gas flow channels 8 formed in the interconnect 9 to an outlet plenum 17b and then exit through a separate outlet riser channel 16b.

The cathode side, illustrated in FIG. 3A, can include gas flow passages or channels 8 between ribs 10 which direct air flow 44 over the cathode electrode of the fuel cell. The cathode side of the interconnect may include elevated portions surrounding the respective riser channels 16a, 16b and seals 15a, 15b may be provided on the elevated portions surrounding the riser channels 16a, 16b and may seal the respective riser channels 16a, 16b to the flat surface of the adjacent SOFC 1 in the stack to prevent fuel from reaching the cathode electrode of the fuel cell. The seals 15a, 15b may have a donut or hollow cylinder shape as shown so that the riser channels 16a, 16b extend through the hollow middle part of the respective seals 15a, 15b.

In the embodiment of FIG. 3A, the air flow 44 enters the gas flow passages or channels 8 on a first side 301 of the interconnect 9, flows over the cathode electrode of the fuel cell, and exits the gas flow passages or channels 8 on a second side 302 of the interconnect opposite the first side 301. The cathode side of the interconnect 9 may have elevated portions along the periphery of the third 303 and fourth 304 sides of the interconnect, and strip seals 15c may be provided on the elevated portions to seal the cathode side of the interconnect to the surface of the adjacent SOFC 1. On the anode side of the interconnect, as shown in FIG. 3B, a flat elevated surface may completely surround the periphery of the fuel flow passages 8 and a peripheral seal 15d (i.e., a window seal) may be located on the surface to seal the anode-side of the interconnect to the adjacent SOFC 1 and prevent air from reaching the anode electrode of the fuel cell.

The side of the air end plate 19 which faces the adjacent final cathode electrode 7 of the stack may have the same flow channel 8 and rib 10 geometry as the air sides of the interconnects 9 shown in FIG. 3A. However, the opposite side of the air end plate 19 which faces away from its stack does not need to have any flow channels 8 or ribs 10, since this side is used for electrical interconnection with an adjacent stack or with an electrical terminal.

The side of the fuel end plate 39 which faces the adjacent final anode electrode 3 of the stack may have the same flow channel 8 and rib 10 geometry as the fuel sides of the interconnects 9 shown in FIG. 3B. However, the opposite side of the fuel end plate 39 which faces away from its stack does not need to have any flow channels 8 or ribs 10, since this side is used for electrical interconnection with an adjacent stack or with an electrical terminal.

In FIGS. 3A and 3B, the riser channel openings 16a, 16b are shown as fuel inlet and fuel outlet openings in the interconnect 9. This interconnect is configured for a fuel cell stack which is internally manifolded for fuel, in which the fuel travels through the stack through fuel riser channels which are formed by mated openings through the stacked interconnects and fuel cells. However, if desired, the interconnect 9 may be configured for a stack which is externally manifolded for fuel. In this case, the top and bottom edges of the interconnect 9 shown in FIG. 3B would function as fuel inlet and outlet, respectively, for the fuel which flows externally to the stack. Furthermore, the interconnect 9 shown in FIGS. 3A and 3B is configured for a stack which is externally manifolded for air. However, additional openings through the interconnect may be formed, such as on the left and right sides of the interconnect, for the interconnect to be configured for a stack which is internally manifolded for air.

Figure 4A:
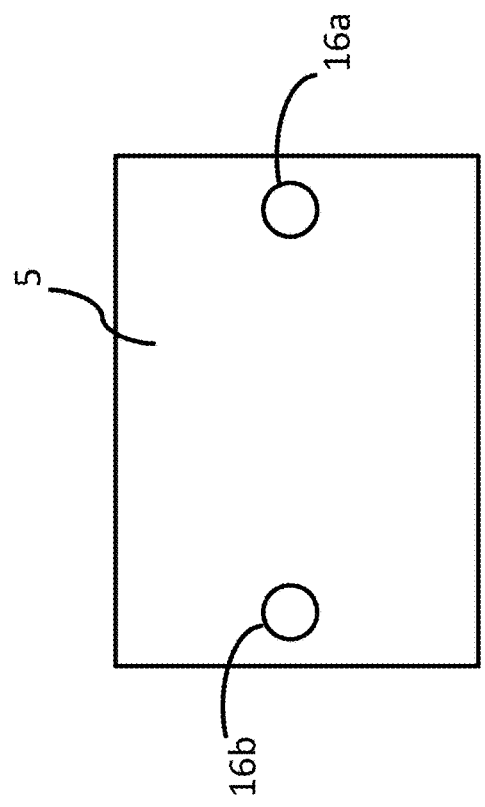
FIG. 4A is a plan view of an electrolyte of a fuel cell.

FIG. 4A is a plan view of a solid oxide electrolyte 5. The electrolyte 5 may comprise a stabilized zirconia, such as scandia stabilized zirconia (SSZ) or yttria stabilized zirconia (YSZ). Alternatively, the electrolyte 5 may comprise another ionically conductive material, such as a doped ceria. In this embodiment, the electrolyte 5 has a planar geometry, although it will be understood that other geometries, such as a tubular geometry, could be utilized. Riser channel openings 16a, 16b, which in this embodiment comprise circular holes, extend through the electrolyte 5. The riser channels 16a, 16b generally comprise fuel inlet and outlet openings that extend through at least one layer of the fuel cells. When the fuel cells and interconnects are assembled into a stack, such as shown in FIG. 2, the respective riser channels 16a, 16b of the fuel cells 5 and the interconnects 9 may form a continuous fluid passageway extending through multiple electrolyte layers 5 and interconnects 9. Fuel can flow in a fuel reactant path through the inlet riser channel 16a to the anode-side of each fuel cell. There, the fuel flows over the fuel cell anode 3 via gas flow channels 8 formed in the gas flow separator/interconnect plate 9, and then exits through separate outlet riser channel 16b. Air can flow in an air reactant path through inlet openings on a periphery of the stack (i.e., through the open sides 301 of the interconnects 9, as shown in FIG. 3A), over the fuel cell cathode 7 via gas flow channels 8 formed in the interconnect 9, and exit through outlet openings on a periphery of the stack (i.e., through the open sides 302 of the interconnects 9, as shown in FIG. 3B).

Figure 4B:
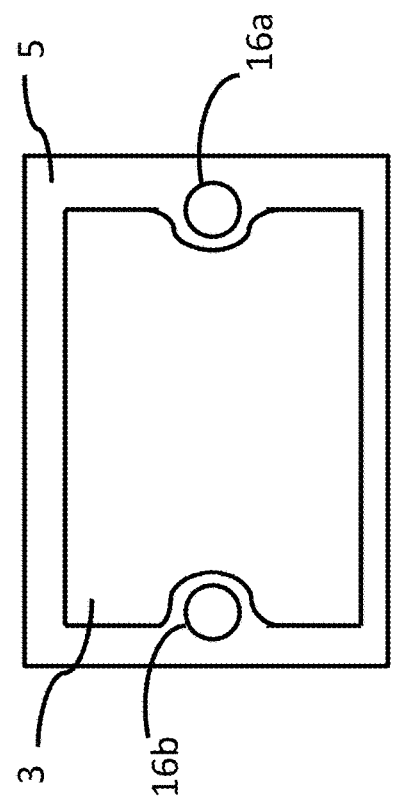
FIG. 4B is a plan view of an electrolyte and an anode electrode of a fuel cell.

In FIG. 4B, an anode (e.g., fuel) electrode 3 is shown covering part of a first major surface of the electrolyte 5. A cathode (e.g., air) electrode 7 (not shown) can cover part of the second major surface on the opposite side of the electrolyte 5.

The SOFC 1 in this embodiment is configured for a stack that is internally manifolded for fuel and externally manifolded for air. Thus, the stack is open on the air inlet and outlet sides. Alternatively, the SOFC 1 may be configured for a stack which is internally manifolded for both air and fuel. In this case, the electrolyte would contain additional air inlet and outlet openings. Alternatively, the SOFC 1 may be externally manifolded for air and fuel.

In high temperature fuel cell systems, such as SOFC systems, it is difficult to identify certain types of defects, such as small cracks in the electrolyte and defective seals (e.g., seals with cracks or voids between the seal and an adjacent stack component, such as an adjacent fuel cell or interconnect). Such defects may result in leaks which allow mixing of the reactant streams (e.g., air and fuel) in the fuel cell stack and/or leakage of the fuel stream out of an internally-manifolded stack and may result in a shortened useful lifetime of the fuel cell stack. Typically, such defects are not identified until after the stacks are heated to their operating temperatures (e.g., 750° C. and 950° C.) and brought into an operational condition.

Various embodiments include systems methods for accurate, rapid and non-destructive testing of fuel cell stacks that can be performed at temperatures that are significantly lower than the stack operating temperature, including at ambient temperature. In one embodiment, a system for testing a fuel cell stack includes a sniffer device for detecting a leak from one portion of a fuel cell stack to another portion of the fuel cell stack. The sniffer device may include a vacuum source, a test head including at least one vacuum plenum coupled to the vacuum source, where the test head may be positioned within or adjacent to a first portion of the stack, and a detector in fluid communication with the at least one vacuum plenum for detecting the presence of a particular constituent in the first portion of the stack.

The at least one vacuum plenum of the test head may be an isolated vacuum plenum, meaning that the vacuum plenum may obtain gas (e.g., air) samples from a localized portion of the stack (e.g., from a single fuel cell or from a portion of a fuel cell) while minimizing or eliminating contamination from the outside atmosphere. In some embodiments, an isolated vacuum plenum may be a vacuum nozzle that is held against a portion of a fuel cell stack (e.g., a side of the stack) and may optionally be sealed against the stack (e.g., by a gasket or other sealing member). In other embodiments, an isolated vacuum plenum may be a hollow tubular member (e.g., a prong or needle) that extends from the test head and may be inserted within a portion of the stack (e.g., between ribs of the interconnect within an open side surface of a fuel cell stack that is externally manifolded for a reactant) to isolate the plenum from the outside environment. In embodiments, the test head may comprise a plurality of isolated vacuum plenums that may be positioned adjacent to or at least partially within the stack to obtain gas samples from a plurality of localized portions of the stack (e.g., from a plurality of fuel cells and/or from a plurality of locations within a single fuel cell). The gas samples may be analyzed sequentially and/or in parallel by one or more detectors to detect the presence of the particular gas constituent within the samples.

Figure 5:
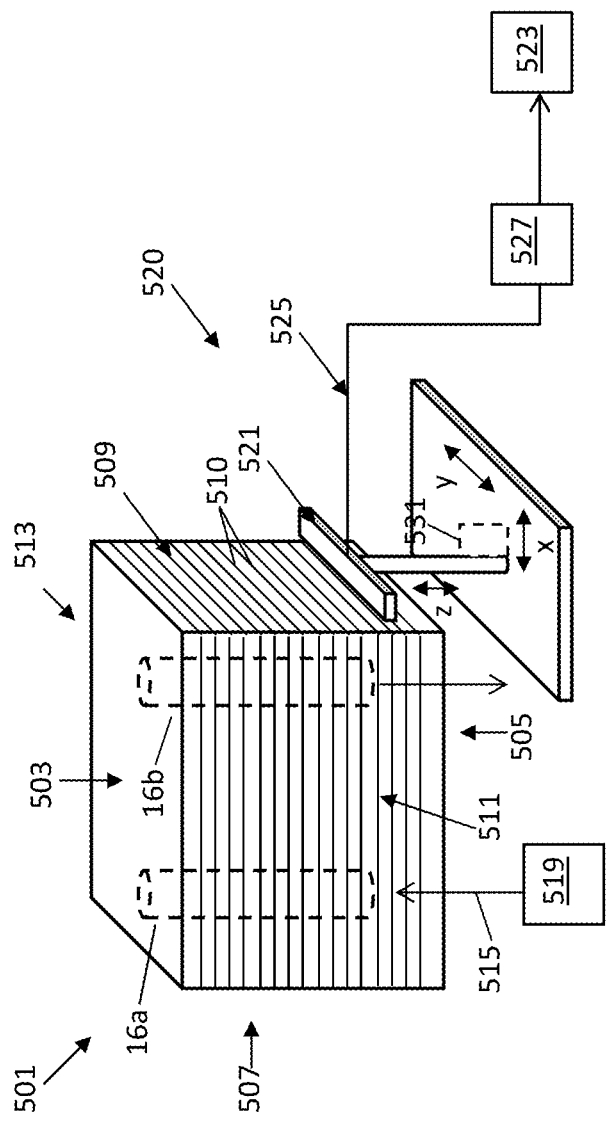
FIG. 5 schematically illustrates a perspective view of a system for detecting leaks in a fuel cell stack according to an embodiment.

FIG. 5 illustrates a fuel cell stack 501 which may be a SOFC stack comprising a plurality of solid oxide fuel cells separated by conductive interconnects, as described above. The stack 501 may have a top side 503, a bottom side 505, and a plurality of side surfaces 507, 509, 511 and 513. In this embodiment, side surface 507 may be an open side surface, meaning that the side surface contains a plurality of inlet openings (not visible in FIG. 5) located between the fuel cells and an adjacent interconnect of the stack (between ribs of the interconnect). Side surface 509 may also be an open side surface that contains a plurality of outlet openings 510 between the fuel cells and the adjacent interconnects. Side surfaces 511 and 513 may be closed side surfaces, meaning that the fuel cells are sealed (e.g., by seals 15c and 15d shown in FIGS. 3A and 3B) to the adjacent interconnects along the side surfaces 511, 513 (i.e., there are no inlet or outlet openings on side surfaces 511 and 513). The stack 501 may be assembled by alternately stacking SOFCs 1 with interconnects 9 (such as interconnect 9 shown in FIGS. 3A and 3B) so that the anode facing surfaces of the interconnects 9 (see FIG. 3B) face the anode-sides of the fuel cells and the cathode facing surfaces of the interconnects 9 (see FIG. 3A) face the cathode sides of the fuel cells. The first sides 301 of the interconnects 9 may be located along open side surface 507 of the stack, the second sides 302 of the interconnects 9 may be located along open side surface 509 of the stack, and the third and fourth sides 303, 304 of the interconnects 9 may be located along the closed side surfaces 511 and 513 of the stack.

The stack 501 also includes riser channels 16a, 16b that extend through the fuel cells and interconnects of the stack 501 (shown in dashed lines in FIG. 5). In operation, a first reactant 515 (e.g., fuel) may flow into the stack 501 through the inlet riser channel 16a, portions of the first reactant may flow into spaces between the anode sides of the fuel cells and the adjacent interconnects of the stack, and then out of the stack 501 via the outlet riser channel 16b. A second reactant (e.g., air) may flow into the stack 501 through the inlet openings on the side surface 507 of the stack 501 into the spaces between the cathode sides of the fuel cells and the adjacent interconnects of the stack and then out of the stack 501 via the outlet openings 510. The stack 501 may include seals, such as seals 15a, 15b, 15c and 15d shown in FIGS. 3A and 3B, which prevent the reactants from mixing within the stack 501 and the fuel from leaking out of the sides 507, 509, 511, 513 of the stack 501.

FIG. 5 schematically illustrates an embodiment system for testing the fuel cell stack 501 for leak defects, which may be the result of electrolyte cracks or defective seals. As shown in FIG. 5, a fluid 515 (e.g., a gas) comprising a particular constituent to be detected is provided in the first reactant flow path (i.e., the fuel flow path) of the stack. The fluid 515 may be provided from a fluid source 519 and flowed through the fuel flow path (i.e., through the inlet riser channel 16a, into the spaces between the anode sides of the fuel cells and the adjacent interconnects and out through the outlet riser channel 16b) in a first portion of the stack 501. The particular constituent of the fluid 515 may be hydrogen. For example, the fluid 515 may comprise a gas containing about 3-5 vol. % of hydrogen (e.g., the fluid 515 may comprise a forming gas comprised of nitrogen, argon or other inert gas with 3-5 vol. % of hydrogen and/or may comprise a mixture of air and hydrogen). Hydrogen gas may be used for the particular constituent for detection due to its relatively high diffusion rate and ability to flow through small areas (i.e., cracks), although it will be understood that other easily-detectable constituents, such as helium gas, natural gas and/or methane could also be utilized.

The flow rate, pressure and/or concentration of the particular constituent in the fluid 515 may be varied to optimize the testing sensitivity. The flow of the fluid 515 may be regulated to prevent pressure build up from damaging the stack 501. In some cases, it may be desirable to utilize a relatively higher pressure in order to enhance the leak rate.

A sniffer device 520 includes a vacuum source 523 and a test head 521 having at least one vacuum plenum coupled to the vacuum source 523 by at least one fluid conduit 525. The test head 521 may be positioned within or adjacent to a second portion of the stack 501 that is separated from the first portion of the stack which contains the fuel reactant flow path (i.e., the second portion of the stack may be separated from the first portion containing the fuel reactant flow path by one or more electrolytes and/or seals). As shown in FIG. 5, the test head 521 may be located adjacent to the open side surface 509 of the stack 501 containing the outlet openings 510 of the air flow path. The test head 521 may be used to collect samples of fluid (e.g., air) from localized areas of the stack 501, such as from the openings 510 of the air flow path and/or from around the side surface(s) 507, 509, 511, 513 of the stack 501. A detector 527 may be located downstream of the test head 521 and may be used to detect the presence of the particular constituent in the collected samples. For example, where the particular constituent is hydrogen, the detector 527 may comprise a hydrogen detector, such as a small proton exchange membrane (PEM) fuel cell. Where the particular constituent is natural gas, the detector 527 may be a natural gas detector, such as an electrochemical or semiconductor gas sensor. The detection of the particular constituent may be used to determine the existence of a leak in the stack, which may be the result of a crack in a fuel cell electrolyte, a faulty seal, or other defect. The detector (e.g., a PEM fuel cell) may output an electrical signal (e.g., a current or voltage signal) that corresponds to the amount of the particular constituent in the sample gas, which may enable a quantitative measurement of the size of a particular leak. A leak detection method according to the various embodiments may enable corrective action to be taken in response to detecting a leak defect, such as by repairing, replacing or by-passing the defective stack component, which may advantageously increase stack yield and performance.

In embodiments, the test head 521 may be moved to different locations on the stack 501. For example, an actuator 531, such as a motorized linear actuator, may be operable to move the test head 521 to different vertical positions on the stack (i.e., along the direction of the fuel cell stacking, or the z-axis in FIG. 5). One or more actuators may also move the test head towards or away from the surface of the stack 501 (i.e., along the x-axis dimension in FIG. 5) and/or laterally over the surface of the stack 501 (i.e., along the y-axis dimension in FIG. 5). Alternately or in addition, the stack 501 may be provided on a moveable support or stage (not shown in FIG. 5), and the stack 501 may be moved relative to the test head 521 to obtain samples from different locations on the stack 501. Also, although the sniffer device 520 of FIG. 5 shows the test head 521 adjacent to one side surface 509 of the stack 501, it will be understood that a test head may extend adjacent to multiple side surfaces of the stack, including around the entire perimeter of the stack. The test head 521 may also be configured to be inserted into the stack, such as within the fuel riser channels 16a, 16b. In addition, various embodiments of a sniffer device 520 may include multiple test heads 521 at various positions on the stack 501.

FIG. 6A is a partial cross-section view of a fuel cell stack 501 with a test head 521 adjacent to a side surface 509 of the stack 501, such as shown in FIG. 5. FIG. 6B is a front view of the test head 521 illustrating a plurality of isolated vacuum plenums 601 taken along line B-B' in FIG. 6A. FIG. 6A illustrates a pair of fuel cells 1 separated by interconnects 9 which define the fuel (i.e., anode) and air (i.e., cathode) flow paths. A crack 603 in the fuel cell electrolyte may allow fuel to leak from the anode side to the cathode side of the cell, as illustrated in FIG. 6A. This can decrease the efficiently as well as the longevity of the fuel cell. In addition, defects in the fuel cell seals, such as in a window seal 15d around the periphery of the anode-side of the fuel cells 1, or in a seal surrounding the fuel riser openings 16a, 16b (see seals 15a, 15b in FIG. 3A) may result in similar problems. In FIG. 6A, the fuel riser openings 16a, 16b may be located out of the plane of the drawing (e.g., above or below the plane of the drawing) and the seals 15a, 15b which surround the respective fuel riser openings 16a, 16b on the cathode side of each fuel cell are not shown in FIG. 6A for clarity to illustrate the path of the fluid.

As discussed above, a system and method for leak detection in a fuel cell stack includes introducing a fluid (e.g., a gas) containing a particular constituent to be detected into a first portion of the fuel cell stack, such as the fuel flow path, and detecting for the presence of the particular constituent in a second portion of the stack that may be separated from the first portion by one or more electrolytes and/or seals. The detected presence of the particular constituent may indicate a leak defect, such as a crack in an electrolyte or seal. This is schematically illustrated in FIG. 6A, which shows a hydrogen-containing gas (indicated by arrows) flowing through the fuel flow path of the stack. A portion of the gas leaks through the crack 603 in the electrolyte of a fuel cell 1 and into the air flow path of the fuel cell.

The test head 521 may be positioned in contact with the side surface 509 of the stack 501, as shown in FIG. 6A, with at least one vacuum plenum 601 facing the stack 501. In this embodiment, the test head 521 includes four vacuum plenums 601, as shown in FIG. 6B, although it will be understood that the test head 521 may include a greater or lesser number of vacuum plenums 601. In this embodiment, the vacuum plenums 601 comprise vacuum nozzles that suck in gas from localized regions of the stack 501. Each of the nozzles is coupled to a fluid conduit 605 which provides the gas to a detector 527 (see FIG. 5) configured to detect for the particular constituent (e.g., hydrogen or natural gas). Conduit 605 may comprise part of conduit 525 shown in FIG. 5. The detector may be sufficiently sensitive to detect small quantities of the particular constituent (e.g., on the order of 10-100 ppm) which may be indicative of a leak through the fuel cell electrolyte and/or seal. The amount of the particular constituent that is detected may be used to determine the size of the leak.

In this embodiment, the vacuum plenums 601 are isolated from the external environment by one or more sealing members 607 (e.g., gasket(s)) that may contact the side surface 509 of the stack 501 when the test head 521 is positioned adjacent to the stack 501, as shown in FIG. 6A. Individual sealing members 607 may surround each of the vacuum plenums 601. Alternately or in addition, a single sealing member may be located on the mating surface of the test head 521 and may surround all of the vacuum plenums 601 of the test head 521. The isolation of the vacuum plenum(s) 601 from the outside environment and optionally from other vacuum plenums of the test head 521 may improve the sensitivity of the testing. For example, isolated vacuum sensors may prevent the detector from becoming oversaturated by the constituent being detected and may also prevent large leaks in the stack from masking the signals from smaller leaks. Thus, the sniffer device 520 may be able to identify leak defects from within a particular fuel cell and in embodiments may also be able to determine the location, size and/or type of leak defect within a particular cell.

Figure 7:
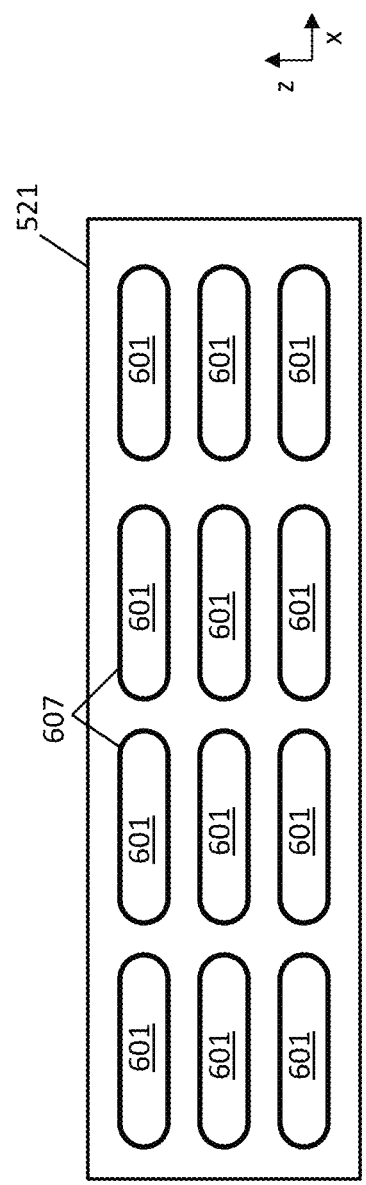
FIG. 7 is a front view of an alternative embodiment of a test head having an array of isolated vacuum plenums extending in two mutually perpendicular directions.

In one embodiment, the vacuum plenums 601 may have a nozzle orifice with a dimension in the z-axis direction that is slightly greater than the width of the air outlet openings 510 of the stack. Openings 510 may comprise the exposed channels 8 between ribs 10 on the air/cathode side of each interconnect 9 in the stack. For example, the width of the nozzle orifice in the z-axis direction may be greater than the width of the air outlet openings 510 and no more than twice the width of the air outlet openings 510 (e.g., the nozzle orifice may be between about 5% and 50% wider than the width of the air outlet openings 510.). This may enable the vacuum plenums 601 to interrogate each fuel cell individually by obtaining localized gas samples from the cell (e.g., from a single air outlet opening 510 or plural openings 510 adjacent to a cathode of one fuel cell). In the embodiment of FIG. 6B, the test head 521 includes a plurality of vacuum plenums 601 arranged laterally along the y-axis for obtaining samples from different locations in a single fuel cell. In other embodiments, the test head 521 may include a matrix of vacuum plenums 601 in the y- and z-axes that may be used to interrogate multiple fuel cells when the test head 521 is positioned adjacent to the stack. An example of this configuration is illustrated in FIG. 7.

Each of the vacuum plenums 601 of the test head 521 may be coupled to a separate fluid conduit 605 or channel. Each channel may have a dedicated detector 527 (see FIG. 5) to allow simultaneous detection of samples from multiple channels. In other embodiments, a plurality fluid channels may be multiplexed to a single detector. A system of valves (e.g., electronically-actuated valves, such as solenoid valves) may be used to selectively couple each channel to the detector. To clear the fluid conduits from the constituent gas from one channel to the next, the system may provide a wait time between successive readings or may purge the conduits, such as by reversing the air flow.

Figure 8:
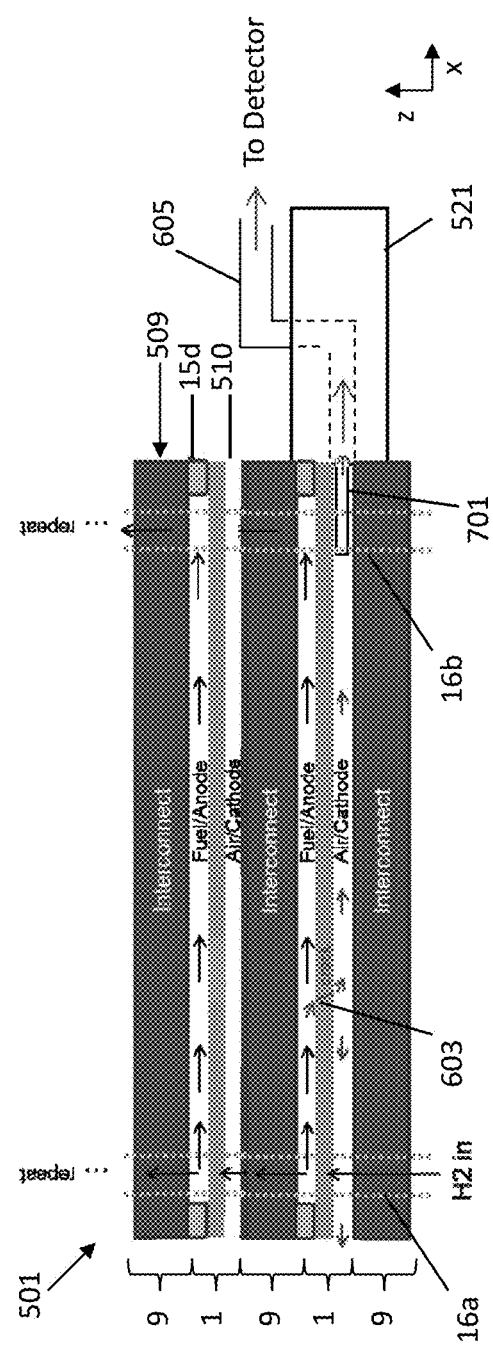
FIG. 8 is a partial cross-section side view of a fuel cell stack and a test head having an isolated vacuum plenum in the form of a hollow tubular member inserted within an air outlet of the fuel cell stack.

FIG. 8 illustrates an alternative embodiment of a test head 521 including one or more isolated vacuum plenums, where each of the plenums comprises a hollow tubular member 701 (e.g., a prong or needle) extending from the surface of the test head 521. The tubular member(s) 701 may be inserted at least partially into the fuel cell stack 501, such as into the air flow path of the fuel cell(s), as shown in FIG. 8. FIG. 8 is a cross-section view which illustrates a single tubular member 701 coupled to a fluid conduit 605, although it will be understood that a test head 521 may include a plurality of tubular members 701 and fluid conduits 605 in a configuration such as shown in FIGS. 6B and 7. In some embodiments, the tubular member(s) 701 may be inserted into the openings 510 which comprise air flow channels 8 between the ribs 10 on the air/cathode side of an interconnect 9 (see FIG. 1). In embodiments, the tubular members 701 may be inserted to a depth of up to about 1 cm (e.g., 0-0.5 cm). Sampling the gas from within the channels 8 may improve the location detection ability of the sniffer device 520 by eliminating cross-contamination and false rejects from leaks that have polluted the outside atmosphere. In addition, a vacuum plenum in the form of a tubular member may reduce the requirements of the seal and can allow sampling from a stack that does not have a flat surface for sealing. In one embodiment, a test head 521 may include one tubular member 701 per air flow channel 8 per interconnect 9, and the tubular members 701 may be simultaneously inserted into the channels with the gas being sampled in parallel. In FIG. 8, the fuel riser openings 16a, 16b are shown in dashed lines because they are located out of the plane (i.e., above or below the plane) of the drawing. Thus, member 701 does not puncture the seals 15a, 15b which surround the fuel riser openings 16a, 16b on the cathode side of each fuel cell.

FIGS. 9A-9D illustrate another embodiment test head 521 comprising a plurality of vacuum plenums 601 extending parallel in the lateral (i.e., y-axis) direction and spaced in the vertical (i.e., z-axis) direction. FIG. 9A is a front perspective view of the test head 521 showing six vacuum plenums 601 on a front (i.e., mating) surface 903 of the test head 521 and six fluid ports 905 on a top surface 907 of the test head 521. FIG. 9B is a top view of the test head 521 showing the configuration of the fluid ports 905, and FIGS. 9C and 9D are cross-section views taken along lines C-C and D-D, respectively, of FIG. 9B illustrating the fluid conduit configuration within the test head 521. In this embodiment, the pitch (i.e., z-axis spacing) between vacuum plenums 601 is fixed, although in alternative embodiments the pitch of the vacuum plenums may be adjustable.

FIGS. 10A-10D illustrate another embodiment of a system 1001 for leak detection in a fuel cell stack. In this embodiment, the system 1001 includes four sniffer devices 520-1, 520-2, 520-3, 520-4 that may be located around the side surfaces of a fuel cell stack. Each of the sniffer devices 520-1, 520-2, 520-3, 520-4 includes a test head 521 with a vacuum plenum 601 that is in fluid communication with a vacuum source 523 and a detector 527 via a fluid conduit 525 (schematically illustrated by arrows in FIGS. 10A-10B).

The test heads 521 in this embodiment each include a single slit-shaped vacuum nozzle 601 that may extend over at least a portion of a side surface of the stack and may be configured to interrogate each fuel cell individually by obtaining localized gas samples from the cell (e.g., from a single air outlet opening 510 or plural openings 510 adjacent to a cathode of one fuel cell and/or from a single seal, such as a window seal 15*d* adjacent to an anode of one fuel cell). The test heads 521 may also include an air inlet 1003 in fluid communication with the vacuum nozzle 601, as shown in FIG. 10A. The air inlet 1003 may be off-set or spaced away from the side surface of the fuel cell stack and may be oriented such that is does not directly face the side surface of the stack. The air inlet 1003 may draw in ambient air under the vacuum pressure provided by the vacuum source 523. The ambient air from the inlet 1003 may mix with the air sample from the stack obtained by the vacuum nozzle 601 within the test head 521, and this mixture may be drawn through the fluid conduit 525 to the detector 527. Because the air inlet 1003 is offset from the side surface of the stack, the ambient air drawn in by the air inlet 1003 may not be contaminated by leaks from a neighboring fuel cell of the stack. This may reduce or eliminate the possibility of the vacuum nozzle 601 sucking in ambient air from adjacent to the surface of the stack that may be contaminated by a leak in a neighboring fuel cell.

As shown in FIGS. 10A and 10B, each of the sniffer devices 520 may include a separate vacuum source 523, which may be a Venturi-type vacuum pump that produces a vacuum by means of the Venturi effect. This may be advantageous for low flow rates and because it does not introduce noise due to cycling action. Other types of vacuum sources 523, such as a diaphragm or vane pump, could also be utilized. A filter 1005 may be located between the test head 521 and the vacuum source 523 and detector 527 to remove dust and other unwanted contaminants from the air samples. The sniffer device 520 may also include a flow meter 1007 to measure the volumetric or mass flow rate of the air, which may be used to normalize the measurements of the constituent being detected obtained by the detector 527. The flow meter 1007 may also be used for "real-time" diagnosis of system operating conditions. For example, if the flow rate measured by the flow meter 1007 is below a predetermined threshold, it may be indicative of a system malfunction, such as a malfunctioning vacuum pump 523 or a clog somewhere in the system (such as the filter 1005). It can be advantageous to know when there is a system malfunction in real-time, as this may indicate that a portion of the test data may be invalid and the stack(s) may need to be re-tested using a properly operating system 1001. This may prevent stacks with leak defects from slipping through the testing process.

FIG. 10C is a cross-section view of the detector 527 according to one embodiment. The detector 527 of FIG. 10C includes a housing 1008 having an inlet 1009 and an outlet 1013 and defining a sensor cavity 1010 including a sensing element 1011 that is sensitive to the particular constituent being detected. The sensor cavity 1010 may have an asymmetric configuration in which the distance between the outlet 1013 and the sensing element 1011 is less than the distance between the inlet 1009 and the sensing element 1011. This may promote laminar flow over the sensing element 1011, as shown in FIG. 10C, which may improve sensitivity of the detector 527. In other embodiments, the sensor cavity may have a symmetric configuration in which the inlet 1009 and outlet 1013 are generally equidistant from the sensing element 1011.

FIG. 10D is a cross-section side view of the system 1001 that illustrates two sniffer devices 520-1 and 520-3 located adjacent to two opposing side surfaces of a fuel cell stack 501. In this embodiment, the height of the test heads 521 and vacuum nozzles 601 of the respective sniffer devices 520-1, 520-3 is offset relative to one another by a predetermined distance in the z-axis direction (e.g., via an offset spacer 1015 as shown in FIG. 10D). The offset distance may be equal to a spacing between different (e.g., adjacent) fuel cells of the stack 501, such that each of the opposing pairs of test heads 521 may interrogate a different fuel cell. This configuration may prevent the respective sniffer devices from obtaining samples from the same fuel cell at the same time, thus competing for the same signal.

A sniffer device 520 such as shown in any of FIGS. 5-10D may use an actuator system (such as the actuator 531 shown in FIG. 5) to automatically interrogate each fuel cell of a fuel cell stack. In one embodiment, the device 520 may be configured to determine the spacing (pitch) between fuel cells based on the height of the stack 501 in order to compensate stacking tolerances of the fuel cell stacks. Alternately or in addition, the device 520 may use an optical detection system to determine the spacing between fuel cells.

In one embodiment of a stack testing method, a test head 521 of the sniffer device 520 may be positioned adjacent to a first fuel cell (or section of fuel cells) of the stack 501. An actuator (i.e., x-axis actuator) may move the test head 521 to seal against the surface of the stack 501. The sniffer device 520 may then obtain gas samples from the stack. For a test head 521 that includes multiple isolated vacuum nozzles 601, the nozzles 601 may obtain samples simultaneously (i.e., parallel detection) or each nozzle 601 may be operated sequentially to obtain a sample from a different localized portion of the fuel cell stack. The test head 521 may then be moved away from the stack 501, and an actuator (i.e., z-axis actuator) may then move the test head 521 to the next fuel cell (or section of fuel cells) to repeat the testing process. This process may be repeated until all of the fuel cells of the stack 501 have been tested.

In an alternative embodiment of the testing method, the test head 521 may be spaced a small distance (e.g., 0.5-10 mm) away from the surface of the stack 501 and may be moved across the surface of the stack while the vacuum nozzle(s) 601 obtain samples to determine the existence of a potential leak within the stack 501. When a potential leak is determined (i.e., the detector detects some quantity of the particular constituent being measured), the test head 521 may then be moved against the stack 521 to perform a more thorough test to more accurately determine the location of the leak. This may help improve throughput of the testing process.

A testing method as described above may be used to test fuel cell seals for leaks. For example, the test head 521 may be used to interrogate the window seals 15*d* surrounding the anode-side of the fuel cells, and may also be used on the closed side surfaces 511, 513 of the fuel cell stack 501 (see FIG. 5).

Furthermore, although the methods and systems for leak detection are illustrated for a fuel cell stack 501, the methods and systems may be utilized for testing a column (see FIG. 2) or any other apparatus that is designed to maintain two separate flow paths. The various embodiments may be used to measure interface leaks between fuel cell stacks and between stacks and termination plates, for example, as well as poor sealing on the cell level. The various embodiments are not limited to any of the other specifics mentions in the above examples, and may use different geometries and applications of the detector and nozzle as required.

In the various embodiments described herein, the fluid (e.g., gas) being tested is provided through the fuel channels (anode side) and the leaking gas is detected in the air channels (cathode side), however it will be understood that the reverse configuration (i.e., providing the fluid in the air-side and testing for leaks in the fuel-side) can also be utilized, depending on the geometry and design of the fuel cell. For example, the vacuum plenum(s) 601 may be provided in the fuel riser channels 16a, 16b to detect for leaks from the air flow path of the stack. In this example, the fluid (e.g., gas) containing the particular constituent to be detected may be provided sequentially in the air flow passages (e.g., passages 510) of the stack.

For example, instead of a "pull" method where a vacuum pressure is used to collect gas samples from the stack to detect for a particular constituent, a "push" technique could be utilized. For example, a test head 521 such as described above may be coupled to a source of pressurized fluid (gas) and inject a pressurized fluid containing the particular constituent to be tested into localized portions of the fuel cell stack (e.g., into the air-flow side of a fuel cell). A detector may be provided within or adjacent to a second portion of the fuel cell stack (e.g., within or adjacent to the fuel riser channels) to detect for the presence of the particular constituent. The test head 521 may interrogate different localized portions of the fuel cell stack with pressurized fluid to determine the presence and location of crack defects within the stack.

While solid oxide fuel cell stacks were described above in various embodiments, embodiments can include any other fuel cell systems, such as molten carbonate or PEM fuel cell systems or stacks.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Further, any step or component of any embodiment described herein can be used in any other embodiment.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method of testing a fuel cell stack, comprising:
   positioning at least one isolated vacuum plenum in fluid communication with a first portion of the fuel cell stack;
   providing a gas comprising a particular constituent to be detected in a second portion of the fuel cell stack that is separated from the first portion of the fuel cell stack by at least one of an electrolyte and a seal;
   determining a pitch between fuel cells of the stack;
   moving the at least one vacuum plenum relative to the fuel cell stack and applying a vacuum pressure to the at least one isolated vacuum plenum using a vacuum source to obtain gas samples from different portions of the stack, wherein the vacuum plenum is moved to obtain gas samples from different fuel cells based on the determined pitch;
   providing the gas samples obtained by the at least one isolated vacuum plenum to a detector; and
   detecting for the presence of the particular constituent in the gas samples using the detector.

2. The method of claim 1, further comprising determining the presence or absence of a leak defect in the stack based on the detected presence of the particular constituent in the gas samples.

3. The method of claim 1, wherein:
   the at least one isolated vacuum plenum comprises at least one nozzle orifice; and
   at least one sealing member surrounds the at least one nozzle orifice, and positioning the at least one isolated vacuum plenum in fluid communication with the first portion of the fuel cell stack comprises positioning the at least one sealing member in mating engagement with a surface of the fuel cell stack.

4. The method of claim 1, wherein the at least one isolated vacuum plenum comprises at least one hollow tubular member, and positioning the at least one isolated vacuum plenum in fluid communication with the first portion of the fuel cell stack comprises positioning the at least one hollow tubular member at least partially within the fuel cell stack.

5. The method of claim 1, wherein:
   the particular constituent comprises hydrogen; and
   the hydrogen comprises about 3-5 volume percent of the gas provided in the second portion of the fuel cell stack; and
   the detector comprises a proton exchange membrane (PEM) fuel cell that receives the gas samples from the at least one isolated vacuum plenum and generates an electrical signal indicating the presence of the particular constituent.

6. The method of claim 1, wherein:
   the first portion of the fuel cell stack comprises a flow path for a first reactant and the second portion of the fuel cell stack comprises a flow path for a second reactant; and
   the fuel cell stack is externally manifolded for the first reactant and comprises inlet and outlet openings of the first reactant flow path on one or more open side surfaces of the stack; and
   positioning at least one isolated vacuum plenum in fluid communication with a first portion of the fuel cell stack comprises positioning the at least one isolated vacuum plenum within or adjacent to at least one opening of the first reactant flow path.

7. The method of claim 6, wherein:
   the fuel cell stack is internally manifolded for the second reactant and comprises seals to prevent the second reactant from leaking from the sides of the stack;
   the first reactant paths comprise air channels;
   the second reactant paths comprise fuel riser openings each of which extends axially through at least one of plural fuel cells and plural interconnects of the fuel cell stack; and
   the gas comprises hydrogen or helium which is provided into the least one fuel riser opening; and
   the at least one isolated vacuum plenum obtains the gas samples from at least one opening of the first reactant flow path to detect for the presence of a leak in an electrolyte or seal of a particular fuel cell of the fuel cell stack.

8. The method of claim 7, wherein:
the at least one isolated vacuum plenum comprises at least one nozzle orifice having at least one dimension that is greater than a width of the openings of the first reactant flow path and no more than twice the width of the openings of the first reactant flow path; or
the at least one isolated vacuum plenum comprises at least one hollow tubular member that is be inserted within an opening of the first reactant flow path.

9. The method of claim 7, wherein:
a plurality of isolated vacuum plenums are positioned within or adjacent to at least one opening of the first reactant flow path to detect for the presence of a leak in a particular portion of a fuel cell of the fuel cell stack; or
a plurality of isolated vacuum plenums are positioned within or adjacent to different openings of the first reactant flow path to detect for the presence of a leak in a plurality of fuel cells of the fuel cell stack.

10. The method of claim 1, wherein a plurality of isolated vacuum plenums obtain gas samples from different portions of the fuel cell stack simultaneously, wherein each of the gas samples is provided to a different detector for detecting the presence of the particular constituent in the gas sample.

11. The method of claim 1, wherein a plurality of isolated vacuum plenums obtain gas samples from different portions of the fuel cell stack sequentially, wherein the gas samples from the plurality of isolated vacuum plenums are provided to a detector for detecting the presence of the particular constituent in the gas sample in a multiplex arrangement.

12. The method of claim 1, wherein the at least one vacuum plenum is positioned adjacent to a seal of the fuel cell stack to detect for a leak in the seal.

13. A method of testing a fuel cell stack, comprising:
positioning at least one isolated vacuum plenum in fluid communication with a first portion of the fuel cell stack;
providing a gas comprising a particular constituent to be detected in a second portion of the fuel cell stack that is separated from the first portion of the fuel cell stack by at least one of an electrolyte and a seal;
moving the at least one vacuum plenum relative to the fuel cell stack and applying a vacuum pressure to the at least one isolated vacuum plenum using a vacuum source to obtain gas samples from different portions of the stack;
maintaining the at least one vacuum plenum at a distance away from a surface of the stack while the at least one vacuum plenum is moved over the surface to obtain the gas samples to detect for a potential leak in the stack;
moving the at least one vacuum plenum to the side surface of the stack to test for a leak in a particular portion of the stack in response to detecting a potential leak;
providing the gas samples obtained by the at least one isolated vacuum plenum to a detector; and
detecting for the presence of the particular constituent in the gas samples using the detector.

* * * * *